July 14, 1953 — W. H. RUPP — 2,645,467
LEANING BUBBLE TOWER
Filed Jan. 25, 1951

Walter H. Rupp   Inventor
By W. O. Heilman   Attorney

Patented July 14, 1953

2,645,467

UNITED STATES PATENT OFFICE 2,645,467

LEANING BUBBLE TOWER

Walter H. Rupp, Mountainside, N. J., assignor to Standard Oil Development Company, a corporation of Delaware Application January 25, 1951, Serial No. 207,672

4 Claims. (Cl. 261—114)

This invention relates to a fractionating tower and more specifically relates to a fractionating tower which is slanted off the vertical.

It is the main object of this invention to provide a fractionating column having increased liquid downcomer and vapor disengaging area for a given diameter tower.

Another object of the invention is to provide a tower in which higher capacities can be obtained from a given tower diameter with no decrease in the contacting efficiency.

Still another object of the invention is to provide a tower in which both liquid and vapor handling capacities can be increased simultaneously.

A still further object of this invention is to provide a tower in which stream line flow down the tower is obtained.

In order to make the invention more clearly understood, there is shown in the accompanying drawings one means for carrying the same into practical effect.

Figure 2:
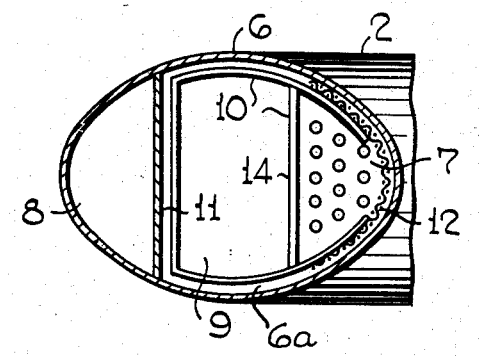
Fig. 2 is a plan view of one of the contacting plates of the tower.
Figure 1:
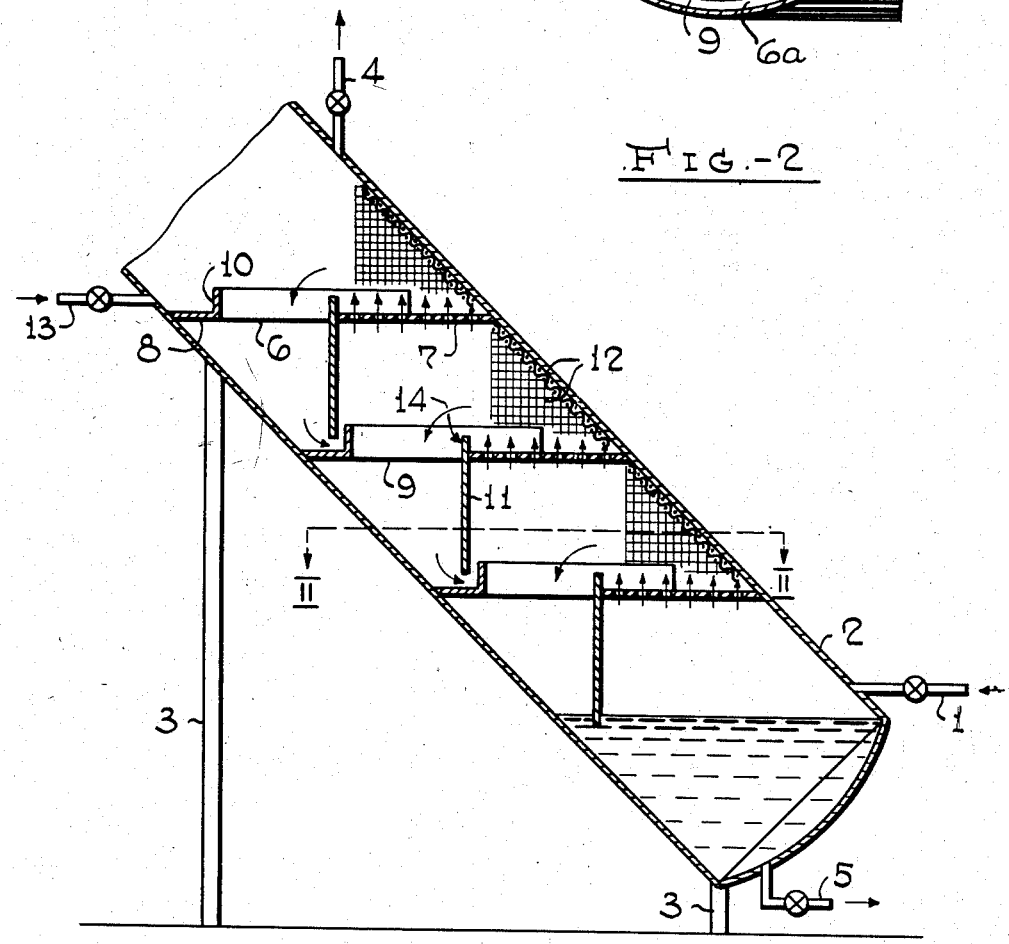
Fig. 1 is a vertical sectional elevational view of a fractionating tower equipped to carry out the objects of the present invention.

Referring in more detail to the drawings, 1 designates an inlet through which vapors may be introduced and 13 designates an inlet through which liquid may be introduced. The vapors discharge into the lower portion of an inclined shell 2 slanted about 45° off vertical and supported by beams 3. The shell is also provided with vapor outlet 4 and liquid outlet 5. Superposed, ellipse-shaped decks 6 having perforate section 7 and imperforate section 8 are placed at spaced intervals throughout the length of the tower. Instead of perforations the plate may be provided with bubble caps or any other contacting devices known to the art. The imperforate section 8 is connected with the perforate section 7 by means of narrow web sections 6a peripherally of the plate, which portions are also imperforate. The inner edges of the perforate and imperforate sections and of the opposed web sections define an enlarged opening 9 surrounded by dam 10. Extending downwardly from the portion of dam 10 adjacent the perforate section and forming the liquid downcomer extending downwardly to the plate below, is baffle 11 having weir portion 14 extending above plate 6. Thus the lower slanting walls of the shell together with baffle 11 define downcomer and vapor-disengaging space for liquid overflowing from each deck through opening 9. Weir 14 does not extend as high vertically as dam 10 to permit liquid to overflow weir 14 preferentially.

Vapors entering through the inlet pipe 1 pass into the interior of the shell 2 and up through the perforations in perforate section 7 of deck 6. The vapors passing through the holes are partially condensed by the descending liquid and the resulting liquid collects on the plate 6 below the top of dam 10. This liquid containing entrained vapors flows over the edge of weir 14 through opening 9 onto the surface of the next lower plate through a channel formed by dam 10 and the wall of shell 2, onto perforate section 7 where it is scrubbed by vapors rising from the plate below. Due to the slanting design of the tower the liquid discharged through opening 9 has an unusually large area and volume to free itself of entrained vapors before flowing on to the next lower perforate section.

Vapors arising from the plate near the edge making an acute angle with the wall of the tower are changed in direction when they strike the wall. In order to assist in reducing the velocity and liquid entrainment of these vapors, pads of wire mesh gauge 12 are provided along the upper wall of the tower where the vapors strike.

By varying the spacing of the plates any desired arrangement or ratio of downcomer area/tower superficial area can be obtained.

The basic novel feature of the present invention is the use of a slanted cylindrical shell as a fractionating tower. The horizontal projection of the tower is an ellipse. Thus all the bubble trays are elliptical in shape resulting in an efficient realization of basic principles of mass and momentum transfer.

The practice of this invention therefore results in uniform vapor-liquid contacting and enables the use of extra large downcomers for low (0.1 to 0.3 ft./sec.) entering velocities on the liquids to be handled. The downcomer area can be as high as 50–90% of the tower superficial area compared to the conventional 5–20% used in most present towers without loss of vapor flow area.

The nature of the present invention having been thus fully set forth and specific examples of the same given, what is claimed as new and useful and desired to be secured by Letters Patent is:

1. A fractionating tower structure comprising an inclined tower shell, a series of plate members mounted horizontally within said shell and longitudinally thereof in superposed vertically spaced relation one to another, each plate consisting essentially of an imperforate end section, an opposed perforate end section, and peripherally opposed narrow web side sections connecting said end sections, the inner edges of said several sections defining an intermediate enlarged passageway through said plate, a dam wall substantially enclosing said passageway including end and side wall portions substantially coextensive with the inner edges of said imperforate and opposed web plate sections, a downcomer element carried by said plate substantially coextensive with the inner edge of said perforate plate section including a dependent baffle extending laterally from wall to wall of said tower below the plate and downward therefrom into vertically spaced relation to the imperforate section of the plate next below, and beyond the upper edge of the dam wall thereof, and a vertical weir extending laterally between dam side wall portions of said plate and vertically upward to a level below the upper edge of said portions.

2. Apparatus according to claim 1, in which said dam wall, side wall sections extend beyond said passageway onto said perforated plate end section, and terminate thereon in substantially opposed spaced end relation.

3. In a fractionating tower according to claim 1, the improvement which comprises a liner for said tower substantially conforming and secured to the tower wall over an area substantially between each plate in said series in the vicinity of the perforate end sections thereof, said liner providing a surface contact area adapted to reduce vapor velocity and liquid entrainment from plate to plate.

4. The improvement according to claim 3, in which said liner is a wire mesh screen material.

WALTER H. RUPP.

References Cited in the file of this patent

UNITED STATES PATENTS

| Number | Name | Date |
| --- | --- | --- |
| 1,564,075 | Lakin | Dec. 1, 1925 |
| 2,070,067 | Rice | Feb. 9, 1937 |
| 2,327,993 | Bragg | Aug. 31, 1943 |
| 2,531,030 | Craft | Nov. 21, 1950 |

FOREIGN PATENTS

| Number | Country | Date |
| --- | --- | --- |
| 38,136 | Norway | Oct. 29, 1923 |
| 328,074 | France | Sept. 1, 1903 |
| 632,450 | France | Oct. 4, 1927 |